United States Patent
Chen

(10) Patent No.: US 9,213,416 B2
(45) Date of Patent: Dec. 15, 2015

(54) ILLUMINATED KEYBOARD

(71) Applicant: Primax Electronics Ltd., Neihu, Taipei (TW)

(72) Inventor: Chung-Yuan Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 246 days.

(21) Appl. No.: 13/867,958

(22) Filed: Apr. 22, 2013

(65) Prior Publication Data
US 2014/0139441 A1    May 22, 2014

(30) Foreign Application Priority Data
Nov. 21, 2012  (TW) .............................. 101143415 A

(51) Int. Cl.
*G06F 3/02*      (2006.01)

(52) U.S. Cl.
CPC .................................... *G06F 3/0202* (2013.01)

(58) Field of Classification Search
CPC ............... H01H 9/00; G06F 3/02; G09G 5/00
USPC ........... 345/168, 170; 200/237, 308, 310, 314
See application file for complete search history.

(56) References Cited

U.S. PATENT DOCUMENTS

| | | | | |
|---|---|---|---|---|
| 7,608,792 | B1* | 10/2009 | Tsai | 200/310 |
| 2009/0014305 | A1* | 1/2009 | Aihara et al. | 200/512 |
| 2010/0288615 | A1* | 11/2010 | Mafune et al. | 200/5 A |
| 2013/0135211 | A1* | 5/2013 | Chiang et al. | 345/168 |

* cited by examiner

*Primary Examiner* — Pegeman Karimi
(74) *Attorney, Agent, or Firm* — Kirton McConkie; Evan R. Witt

(57) ABSTRACT

An illuminated keyboard includes a key, a light guide plate, a sensing circuit layer, and a light-transmissible elastic element. The light-transmissible elastic element is disposed under the key. The light-transmissible elastic element has a light-diffusing part. The light guide plate and the sensing circuit layer are disposed under the light-transmissible elastic element. The sensing circuit layer is used for generating a non-contact key signal. After the light beam transferred within the light guide plate is transmitted upwardly through the light guide plate, the light beam is transmitted through the light-transmissible elastic element. Moreover, since the optical path of the light beam is changed by the light-diffusing part, the light beam can be projected onto the whole keycap more uniformly.

19 Claims, 9 Drawing Sheets

ILLUMINATED KEYBOARD

FIELD OF THE INVENTION

The present invention relates to a keyboard, and more particularly to an illuminated keyboard with an illuminating function.

BACKGROUND OF THE INVENTION

A keyboard is one of the widely-used computer peripheral devices. Via the keyboard, the user may input characters or commands into a computer. FIG. 1 is a schematic top view illustrating the outward appearance of a conventional keyboard. As shown in FIG. 1, the conventional keyboard 1 comprises plural keys 10. When one of these keys 10 is depressed by the user's finger, a corresponding signal is transmitted from the keyboard 1 to the computer, so that a corresponding key function is implemented by the computer. For example, by depressing the key 101, a corresponding English letter or a corresponding symbol is inputted into the computer. By depressing the key 102, a corresponding number is inputted into the computer. Moreover, by depressing the key 103, a corresponding programmed function is quickly executed.

With increasing development of science and technology, the keyboard manufacturers make efforts in designing novel keyboards with diversified functions in order to meet the requirements of different users. Recently, an illuminated keyboard with an illuminating function has been introduced into the market. Consequently, in a case that the illuminated keyboard is used in the dim environment with insufficient luminance, the characters marked on the keys of the illuminated keyboard are still clearly visible to the user.

Since the outward appearance of the conventional illuminated keyboard is similar to the outward appearance of the conventional keyboard 1, only the inner structure of the conventional illuminated keyboard will be illustrated in more details as follows. FIG. 2 is a schematic cross-sectional view illustrating a conventional illuminated keyboard.

Hereinafter, the components of the conventional illuminated keyboard will be illustrated with reference to FIG. 2. As shown in FIG. 2, the conventional illuminated keyboard 2 comprises at least one key 21, a membrane switch circuit module 22, a base plate 23, and a backlight module 24.

The key 21 comprises a keycap 211, an upward/downward supporting member 212, and an elastic element 213.

Moreover, the membrane switch circuit module 22 comprises an upper wiring plate 221 and a lower wiring plate 222. An upper contact 221a is formed on the upper wiring plate 221. Corresponding to the upper contact 221a, a lower contact 222a is formed on the lower wiring plate 222.

Moreover, the backlight module 24 comprises a light guide plate 241, a reflective plate 242, and a light-emitting element 243.

An assembling method and the operating principle of the conventional illuminated keyboard 2 will be illustrated in more details as follows. Firstly, both of the key 21 and the membrane switch circuit module 22 are disposed on the base plate 23, and the backlight module 24 is disposed under the base plate 23.

In particular, the upward/downward supporting member 212 of the key 21 is connected with the keycap 211 and the base plate 23. The elastic element 213 is disposed within the upward/downward supporting member 212, and arranged between the keycap 211 and the base plate 23. The membrane switch circuit module 22 is arranged between the elastic element 213 and the base plate 23.

As the key 21 is depressed, the keycap 211 is correspondingly moved with the upward/downward supporting member 212 in a vertical direction toward the base plate 23, and the membrane switch circuit module 22 is pushed by a protrusion part 213a within the elastic element 213. Under this circumstance, the upper contact 221a and the lower contact 222a of the membrane switch circuit module 22 are contacted with each other to be electrically conducted. Consequently, a corresponding input function is executed. Moreover, the elastic element 213 also provides an elastic force for allowing the keycap 211 to be moved upwardly or downwardly relative to the base plate 23.

Moreover, the light guide plate 241 is disposed under the base plate 23. The reflective plate 242 is disposed under the light guide plate 241. The light-emitting element 243 is located at a side of the light guide plate 241. The light-emitting element 243 is used for providing a light beam to illuminate the illuminated keyboard 2. After the light beam emitted by the light-emitting element 243 is incident into the light guide plate 241, the light beam is guided by the light guide plate 241 to be projected onto the base plate 23. Moreover, the light beam from the light-emitting element 243 may be reflected by the reflective plate 242, so that the light beam is transferred within the light guide plate 241 more uniformly.

From the above discussions, the keycap 211, the upward/downward supporting member 212, the elastic element 213, the membrane switch circuit module 22, the base plate 23, the light guide plate 241 and the reflective plate 242 of the conventional illuminated keyboard 2 are sequentially arranged and assembled from top to bottom.

However, the conventional illuminated keyboard 2 still has some drawbacks. Firstly, since the light guide plate 241 is located at the relatively lower layer of the conventional illuminated keyboard 2, the portion of the light beam transmitted upwardly through the light guide plate 241 to be projected onto the keycap 211 is influenced by the plural overlying substrates and difficultly controlled. Moreover, the elastic element 213 is mainly used to press the membrane switch circuit module 22 in order to make electrical connection between the upper contact 221a and the lower contact 222a. Consequently, the protrusion part 213a within the elastic element 213 is an essential component. Due to the protrusion part 213a, the shape of the elastic element 213 is restricted and fails to be changed at will. Due to the shape of the elastic element 213, the light beam is readily projected to other places instead of the keycap 211. Under this circumstance, the luminance of the keycap 211 is adversely affected, and the light beam projected onto the keycap 211 fails to be uniformly distributed.

Therefore, there is a need of providing an improved illuminated keyboard in order to eliminate the above drawbacks.

SUMMARY OF THE INVENTION

The present invention provides an illuminated keyboard with uniform illuminating efficacy.

In accordance with an aspect of the present invention, there is provided an illuminated keyboard. The illuminated keyboard includes a sensing circuit layer, at least one key, at least one light-emitting element, a light guide plate, and at least one light-transmissible elastic element. The sensing circuit layer is used for generating at least one non-contact key signal. The key is disposed over the sensing circuit layer. When the key is depressed, the non-contact key signal is correspondingly generated by the sensing circuit layer. The light-emitting element is used for providing a light beam to the key. The light guide plate is disposed under the key for transferring the light beam from the light-emitting element. The light-transmissible elastic element is arranged between the key and the light guide plate for providing an elastic force to the key. The light-transmissible elastic element has at least one light-diffusing part. After the light beam from the light-emitting element is transmitted through the light-transmissible elastic element, the light beam is projected onto the key.

In an embodiment, the sensing circuit layer includes a first electrode layer, a second electrode layer and a first substrate. The first electrode layer and the second electrode layer are formed on the first substrate.

In an embodiment, the first electrode layer includes plural first electrode patterns, and the second electrode layer includes plural second electrode patterns. When the sensing circuit layer is electrically conducted, plural electric fields between the plural first electrode patterns and the plural second electrode patterns are generated. As a keycap of the key is moved to a position near a corresponding electric field, the corresponding electric field is changed, so that the non-contact key signal is generated by the sensing circuit layer.

In an embodiment, the sensing circuit layer includes a first electrode layer, a second electrode layer, a second substrate and a third substrate. The first electrode layer and the second electrode layer are formed on the second substrate and the third substrate, respectively.

In an embodiment, the first electrode layer includes plural first electrode patterns, and the second electrode layer includes plural second electrode patterns. When the sensing circuit layer is electrically conducted, plural electric fields between the plural first electrode patterns and the plural second electrode patterns are generated. As a keycap of the key is moved to a position near a corresponding electric field, the corresponding electric field is changed, so that the non-contact key signal is generated by the sensing circuit layer.

In an embodiment, the light guide plate is disposed under the sensing circuit layer.

In an embodiment, the sensing circuit layer is light-transmissible.

In an embodiment, a first electrode layer and a second electrode layer of the sensing circuit layer is made of a transparent and electrically-conductive material.

In an embodiment, the light-transmissible elastic element is disposed on the sensing circuit layer.

In an embodiment, the illuminated keyboard includes a metallic base plate. The metallic base plate is disposed under the light guide plate.

In an embodiment, the light guide plate is disposed over the sensing circuit layer.

In an embodiment, the light-transmissible elastic element is disposed on the light guide plate.

In an embodiment, the illuminated keyboard further includes a metallic base plate. The metallic base plate is disposed under the sensing circuit layer.

In an embodiment, the key includes a keycap and a keycap guiding frame. The keycap guiding frame is used for fixing the keycap and guiding movement of the keycap.

In an embodiment, the illuminated keyboard further includes a supporting plate. The supporting plate is disposed under the keycap guiding frame for fixing the keycap guiding frame.

In an embodiment, the supporting plate further includes an opening. The light-transmissible elastic element is penetrated through the opening and partially exposed over the supporting plate.

In an embodiment, the keycap guiding frame includes at least one hollow portion. The keycap is movable within the hollow portion.

In an embodiment, the keycap is light-transmissible.

In an embodiment, the illuminated keyboard further includes a conductive structure. The conductive structure is formed on an inner surface of the keycap.

In an embodiment, the conductive structure is a metallic paint film or a conductive foam structure.

In an embodiment, the key includes a keycap and a connecting element. The connecting element is connected with the keycap, so that the keycap is movable upwardly or downwardly relative to the sensing circuit layer.

In an embodiment, the connecting element is a scissors-type connecting element.

In an embodiment, the illuminated keyboard further includes a supporting plate. The supporting plate is disposed under the connecting element for fixing the connecting element.

In an embodiment, the supporting plate further includes an opening. The light-transmissible elastic element is penetrated through the opening and partially exposed over the supporting plate.

In an embodiment, the keycap is light-transmissible.

In an embodiment, the illuminated keyboard further includes a conductive structure. The conductive structure is formed on an inner surface of the keycap.

In an embodiment, the conductive structure is a metallic paint film or a conductive foam structure.

In an embodiment, the light-emitting element is located at a side of the light guide plate.

In an embodiment, the illuminated keyboard further includes plural light-guiding structures. The plural light-guiding structures are formed on the light guide plate corresponding to a keycap of the key. The light beam from the light-emitting element is guided by the plural light-guiding structures to be projected onto the keycap.

In an embodiment, the light-diffusing part includes plural microstructures. After the light beam from the light-emitting element is transmitted through the light-transmissible elastic element, an optical path of the light beam is changed by the plural microstructures.

In an embodiment, the plural microstructures are plural V-cut structures or plural texturing structures.

In an embodiment, the light-diffusing part is a curvy surface. After the light beam from the light-emitting element is transmitted through the light-transmissible elastic element, an optical path of the light beam is changed by the curvy surface.

In an embodiment, the light-diffusing part is a lens, which is disposed on a top surface of the light-transmissible elastic element. After the light beam from the light-emitting element is transmitted through the light-transmissible elastic element, an optical path of the light beam is changed by the lens.

In an embodiment, the lens is integrally formed with the light-transmissible elastic element.

In an embodiment, the sensing circuit layer is a capacitive sensing circuit layer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
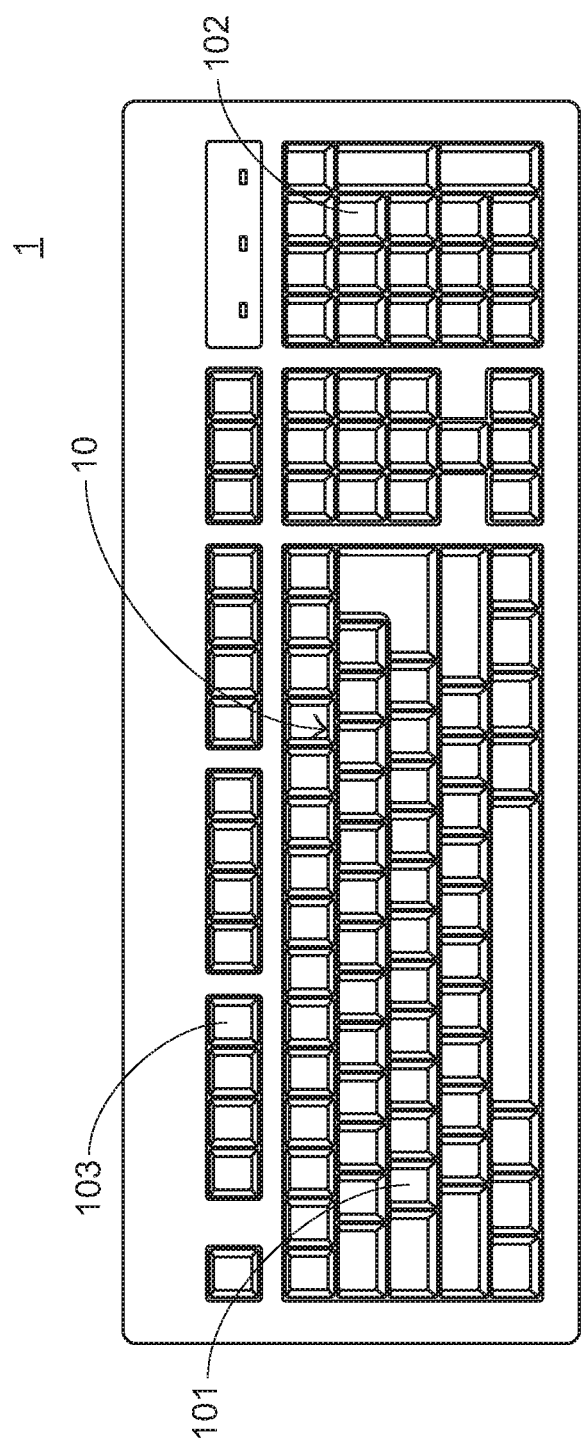
FIG. 1 is a schematic top view illustrating the outward appearance of a conventional keyboard.
Figure 2:
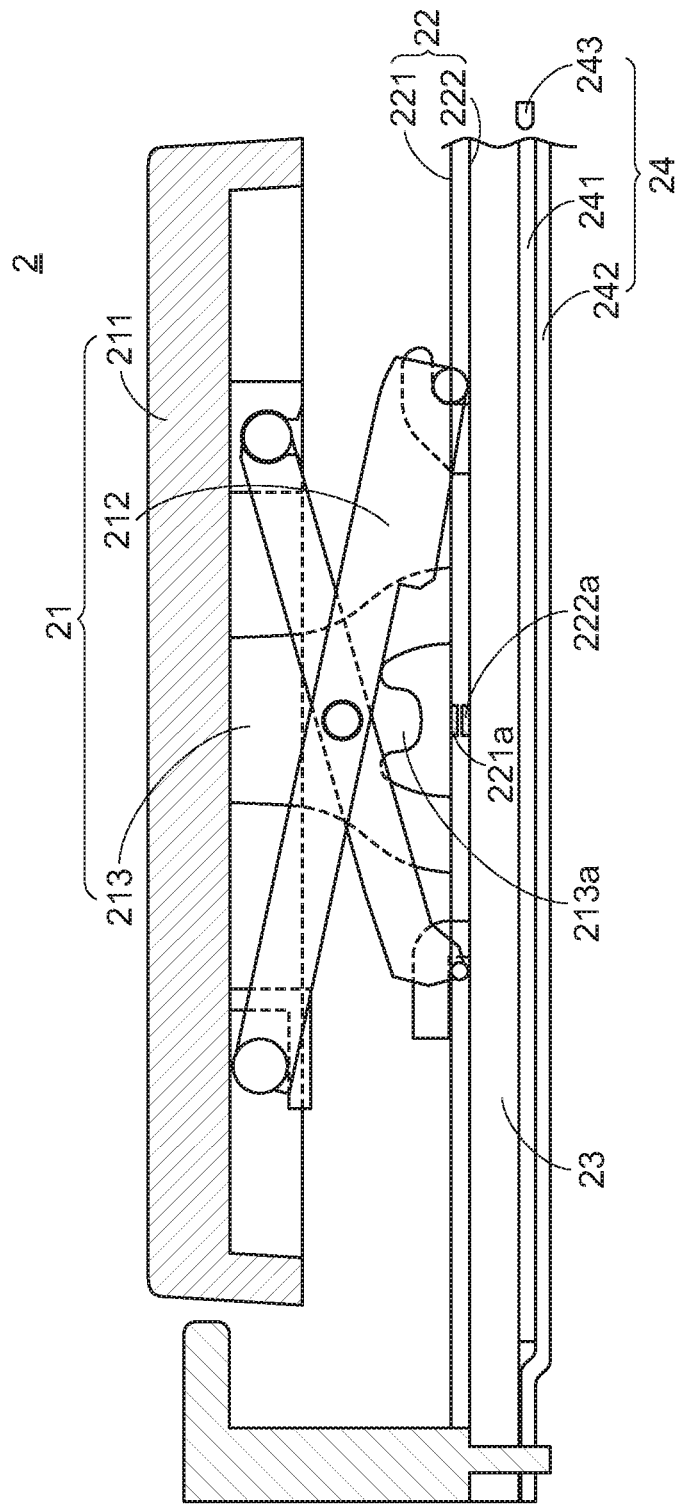
FIG. 2 is a schematic cross-sectional view illustrating a conventional illuminated keyboard.
Figure 3:
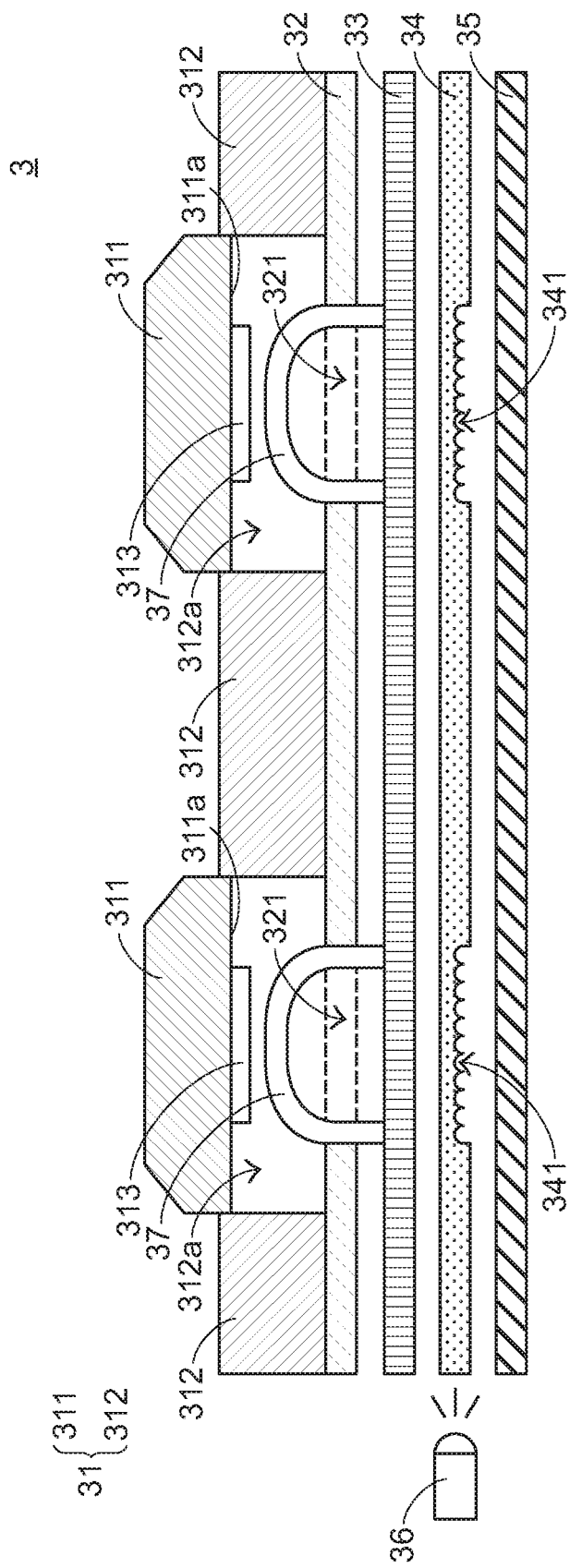
FIG. 3 is a schematic cross-sectional view illustrating an illuminated keyboard according to a first embodiment of the present invention.
Figure 4:
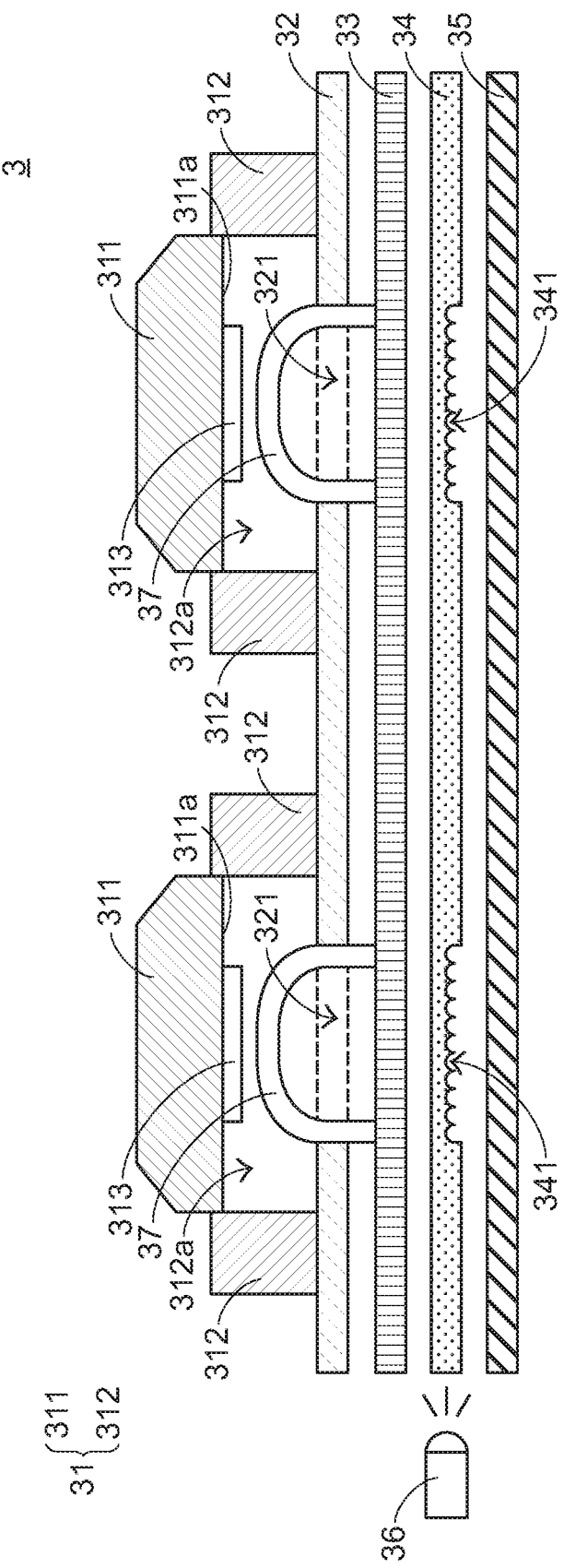
FIG. 4 is a schematic cross-sectional view illustrating a variant of the illuminated keyboard according to the first embodiment of the present invention.

Hereinafter, the configurations of an illuminated keyboard according to a first embodiment of the present invention will be illustrated with reference to FIGS. 3 and 4. FIG. 3 is a schematic cross-sectional view illustrating an illuminated keyboard according to a first embodiment of the present invention. FIG. 4 is a schematic cross-sectional view illustrating a variant of the illuminated keyboard according to the first embodiment of the present invention.

In FIGS. 3 and 4, a key 31, a supporting plate 32, a sensing circuit layer 33, a light guide plate 34 and a metallic base plate 35 of the illuminated keyboard 3 are sequentially arranged from top to bottom. Moreover, the illuminated keyboard 3 further comprises a light-emitting element 36 and a light-transmissible elastic element 37. The light-emitting element 36 is located at a side of the light guide plate 34.

The structures of the components of the illuminated keyboard 3 and the relationships between these components will be illustrated as follows. Firstly, the key 31 comprises a keycap 311 and a keycap guiding frame 312. The keycap guiding frame 312 has a hollow portion 312a. The keycap 311 is fixed in the hollow portion 312a of the keycap guiding frame 312. In addition, the keycap 311 is movable upwardly or downwardly within the hollow portion 312a. The keycap guiding frame 312 is fixed on the supporting plate 32.

Moreover, the keycap 311 is light-transmissible. When a light beam is projected onto the keycap 311, the light beam can be outputted from the character region or the symbol region of the keycap 311. Moreover, a conductive structure 313 is formed on an inner surface 311a of the keycap 311. In this embodiment, the conductive structure 313 is a metallic paint film coated on the inner surface 311a of the keycap 311 or a conductive foam structure fixed on the inner surface 311a of the keycap 311, but is not limited thereto.

As shown in FIG. 3, the keycap guiding frame 312 is an integral sheet-like body. That is, the keycap guiding frame 312 is shared by plural keycaps 311. Moreover, the keycap guiding frame 312 has plural hollow portions 312a under the plural keycaps 311 for accommodating the plural keycaps 311, respectively. Alternatively, in the variant example of FIG. 4, the illuminated keyboard 3 comprises plural keycap guiding frames 312. Each keycap guiding frame 312 is disposed under a corresponding keycap 311. Moreover, each keycap guiding frame 312 has a corresponding hollow portion 312a for accommodating the corresponding keycap 311.

Moreover, the light-transmissible elastic element 37 is disposed on the sensing circuit layer 33. The light-transmissible elastic element 37 is penetrated through a corresponding opening 321 of the supporting plate 32 and partially exposed over the supporting plate 32. As the light-transmissible elastic element 37 is pressed by the keycap 311 and moved downwardly, the light-transmissible elastic element 37 generates an elastic force. In response to the elastic force, the keycap 311 may be returned to an original position where the keycap 311 is not depressed.

In particular, as the keycap 311 is moved downwardly, the light-transmissible elastic element 37 is compressed and subjected to deformation. When the keycap 311 is no longer depressed by the user, the light-transmissible elastic element 37 is restored to its original shape. Consequently, the keycap 311 is moved upwardly and returned to the original position where the keycap 311 is not depressed.

Please refer to FIG. 3 and FIGS. 5-8. More especially, the light-transmissible elastic element 37 further comprises a light-diffusing part 371. FIGS. 5-8 schematically illustrate four exemplary light-diffusing parts of the light-transmissible elastic element used in the illuminated keyboard according to the first embodiment of the present invention. After the light beam emitted by the light-emitting element 36 is transmitted through the light-transmissible elastic element 37, the optical path of the light beam is changed by the light-diffusing part 371. Consequently, the light beam is diffused to the periphery of the keycap 311. In other words, since the light beam passing through the keycap 311 can be distributed more uniformly, the light beam can be uniformly outputted from the character region or the symbol region of the keycap 311.

Figure 5:
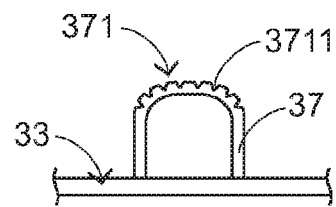
FIG. 5 schematically illustrates a first exemplary light-diffusing part of the light-transmissible elastic element used in the illuminated keyboard according to the first embodiment of the present invention.
Figure 6:
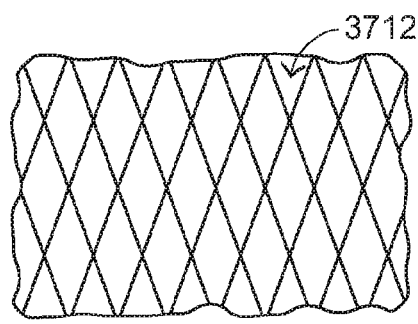
FIG. 6 schematically illustrates a second exemplary light-diffusing part of the light-transmissible elastic element used in the illuminated keyboard according to the first embodiment of the present invention.

For example, the light-diffusing part 371 comprises plural microstructures. As shown in FIG. 5, the plural microstructures of the light-diffusing part 371 are plural V-cut structures 3711, which are produced by a V-cut process. As shown in FIG. 6, the plural microstructures of the light-diffusing part 371 are texturing structures 3712. The texturing structures 3712 are formed on the surface of the light-transmissible elastic element 37 by a chemical etching process.

Figure 7:
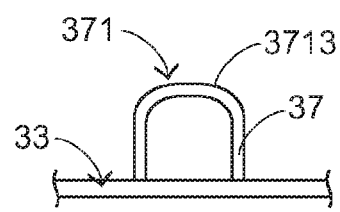
FIG. 7 schematically illustrates a third exemplary light-diffusing part of the light-transmissible elastic element used in the illuminated keyboard according to the first embodiment of the present invention.
Figure 8:
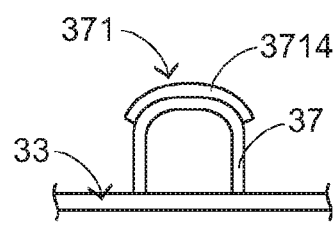
FIG. 8 schematically illustrates a fourth exemplary light-diffusing part of the light-transmissible elastic element used in the illuminated keyboard according to the first embodiment of the present invention.

Alternatively, the light-diffusing part 371 may be a special profile of the light-transmissible elastic element 37. For example, as shown in FIG. 7, the light-diffusing part 371 is a curvy surface 3713 of the light-transmissible elastic element 37. Alternatively, as shown in FIG. 8, the light-diffusing part 371 is a lens 3714, which is formed on a top surface of the light-transmissible elastic element 37. Moreover, the lens 3714 may be integrally formed with the light-transmissible elastic element 37.

As long as the light beam from the light-emitting element 36 can be uniformly projected onto the whole keycap 311 by the light-diffusing part 371, the material, size and shape of the light-diffusing part 371 are not restricted.

Moreover, the sensing circuit layer 33 is disposed under the supporting plate 32 for sensing whether the keycap 311 is depressed by the user or not. If the depressing action of the keycap 311 is sensed by the sensing circuit layer 33, the sensing circuit layer 33 generates a corresponding non-contact key signal. According to the non-contact key signal, a corresponding function (e.g. a function of inputting a character, a symbol or a number into a computer system) is executed.

Figure 9:
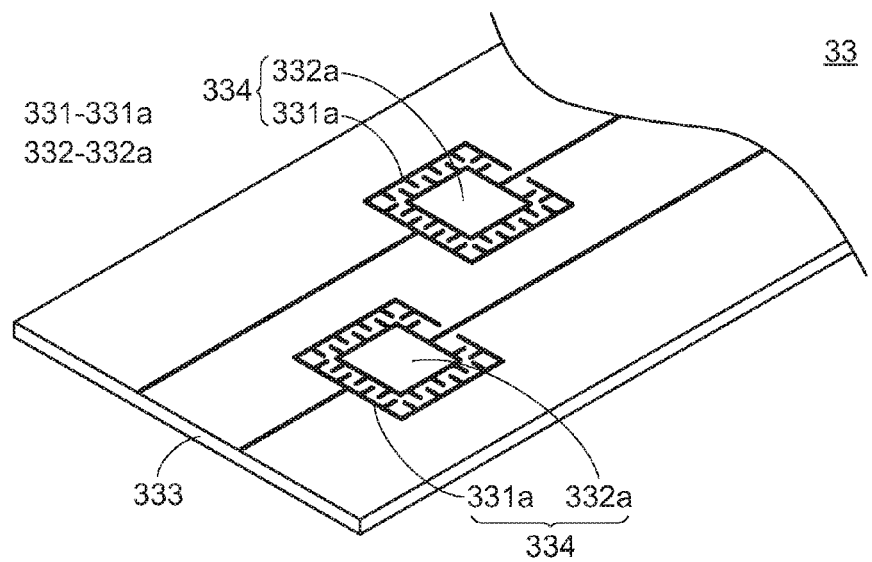
FIG. 9 is a schematic partial perspective view illustrating the outward appearance of a first exemplary sensing circuit layer used in the illuminated keyboard according to the first embodiment of the present invention.

In this embodiment, the sensing circuit layer 33 is a capacitive sensing circuit layer. Hereinafter, two exemplary sensing circuit layers 33 will be illustrated. A first exemplary sensing circuit layer 33 will be illustrated with reference to FIGS. 3 and 9. FIG. 9 is a schematic partial perspective view illustrating the outward appearance of a first exemplary sensing circuit layer used in the illuminated keyboard according to the first embodiment of the present invention. It is noted that the sensing circuit layer 33 as shown in FIG. 9 is presented herein for purpose of illustration and description only. However, those skilled in the art will readily observe that the forming method and the pattern of the sensing circuit layer 33 may be varied according to the practical requirements.

As shown in FIG. 9, the sensing circuit layer 33 comprises a first electrode layer 331, a second electrode layer 332, and a first substrate 333. The first electrode layer 331 and the second electrode layer 332 are sequentially formed on the first substrate 333.

The first electrode layer 331 comprises plural first electrode patterns 331a. The second electrode layer 332 comprises plural second electrode patterns 332a. The plural second electrode patterns 332a are located beside the plural first electrode patterns 331a, respectively.

In this embodiment, each of the plural first electrode patterns 331a and the corresponding second electrode pattern 332a are collaboratively defined as a key switch 334. Each key switch 334 is aligned with the corresponding keycap 311.

For allowing the light beam from the light-emitting element 36 to be projected onto the keycap 311, the first substrate 333 is made of a transparent material. Consequently, the light beam can be transmitted through the middle region of the second electrode pattern 332a and directed to the light-transmissible elastic element 37. In this embodiment, the first electrode layer 331 and the second electrode layer 332 are made of a transparent and electrically-conductive material. An example of the transparent and electrically-conductive material includes but is not limited to indium tin oxide (ITO), indium zinc oxide, aluminum zinc oxide, conductive polymeric material, graphene, silver bromide (AgBr), indium gallium zinc oxide (IGZO), carbon nanotube, nano silver or nano copper.

When the sensing circuit layer 33 is electrically conducted, plural electric fields between the first electrode patterns 331a and the corresponding second electrode patterns 332a of the key switches 334 are generated. As one of the keycap 311 is depressed by the user, the conductive structure 313 on the inner surface 311a of the keycap 311 is moved to a position near the underlying and corresponding electric field. Under this circumstance, the corresponding electric field is changed. Due to the change of the electric field, a controller (not shown) generates a corresponding non-contact key signal.

Figure 10:
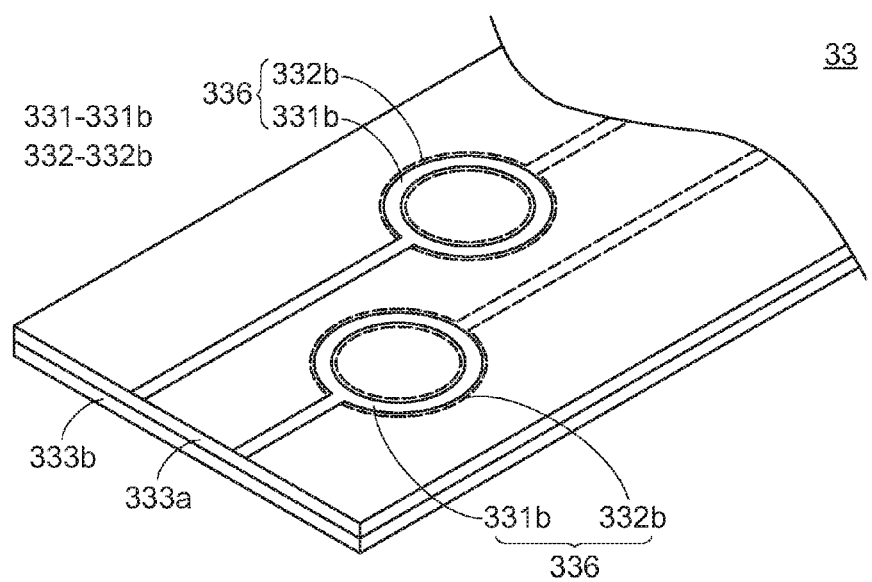
FIG. 10 is a schematic partial perspective view illustrating the outward appearance of a second exemplary sensing circuit layer used in the illuminated keyboard according to the first embodiment of the present invention.

A second exemplary sensing circuit layer 33 will be illustrated with reference to FIGS. 3 and 10. FIG. 10 is a schematic partial perspective view illustrating the outward appearance of a second exemplary sensing circuit layer used in the illuminated keyboard according to the first embodiment of the present invention. It is noted that the sensing circuit layer 33 as shown in FIG. 10 is presented herein for purpose of illustration and description only. However, those skilled in the art will readily observe that the forming method and the pattern of the sensing circuit layer 33 may be varied according to the practical requirements.

As shown in FIG. 10, the sensing circuit layer 33 comprises a first electrode layer 331, a second electrode layer 332, a second substrate 333a, and a third substrate 333b. The first electrode layer 331 and the second electrode layer 332 are formed on the second substrate 333a and the third substrate 333b, respectively.

In this embodiment, the first electrode layer 331 is formed on a bottom surface of the second substrate 333a, and the second electrode layer 332 is formed on a top surface of the third substrate 333b, but is not limited thereto.

The first electrode layer 331 comprises plural first electrode patterns 331b. The second electrode layer 332 comprises plural second electrode patterns 332b, which are indicated by dotted lines. The plural second electrode patterns 332b are located beside the plural first electrode patterns 331b, respectively.

In this embodiment, each of the plural first electrode patterns 331b and the corresponding second electrode pattern 332b are collaboratively defined as a key switch 336. Each key switch 336 is aligned with the corresponding keycap 311.

Moreover, the light guide plate 34 is disposed under the sensing circuit layer 33. The light guide plate 34 is used for transferring the light beam from the light-emitting element 36.

In this embodiment, the light-emitting element 36 is a light emitting diode (LED). The light guide plate 34 is made of a transparent material. An example of the transparent material includes but is not limited to polycarbonate (PC), polymethylmethacrylate (PMMA), polyethylene terephthalate (PET) or silicone.

Moreover, in this embodiment, plural light-guiding structures 341 are formed on a bottom surface of the light guide plate 34. By the plural light-guiding structures 341, the light beam from the light-emitting element 36 and transferred within the light guide plate 34 can be transmitted upwardly through the light guide plate 34 more smoothly. Moreover, the plural light-guiding structures 341 are disposed under the corresponding keycap 311.

That is, by the plural light-guiding structures 341, the light beam from the light-emitting element 36 and transferred within the light guide plate 34 is transmitted upwardly through the light guide plate 34 and then transmitted through the sensing circuit layer 33 and the light-transmissible elastic element 37. Then, by the light-diffusing part 371 of the light-transmissible elastic element 37, the optical path of the light beam is changed by the light-diffusing part 371. Finally, the light beam is uniformly projected onto the keycap 311. Consequently, the light beam can be outputted from the character region or the symbol region of the keycap 311 in order to exhibit the illuminating efficacy.

In accordance with the present invention, the plural light-guiding structures 341 of the light guide plate 34 are produced by a printing method or a non-printing method.

For example, in the printing method, a screen printing process is performed for printing light-guiding ink on the light guide plate 34 to produce the plural light-guiding structures 341 with different shapes and distribution ranges. In the non-printing method, a chemical etching process or a laser engraving process is firstly performed to design a mold and then an injection molding process or a hot embossing process is performed to form the plural light-guiding structures 341 on the light guide plate 34.

It is noted that the plural light-guiding structures 341 as shown in FIG. 3 are presented herein for purpose of illustration and description only. However, those skilled in the art will readily observe that the shape, the forming method and the distribution range of the plural light-guiding structures 341 may be varied according to the practical requirements.

Afterwards, the metallic base plate 35 is disposed under the sensing circuit layer 34 for supporting the above components and increasing the overall structural strength of all components of the illuminated keyboard 3.

It is noted that the metallic base plate 35 is not an essential component. If the illuminated keyboard 3 has sufficient overall structural strength, the metallic base plate 35 may be omitted.

Figure 11:
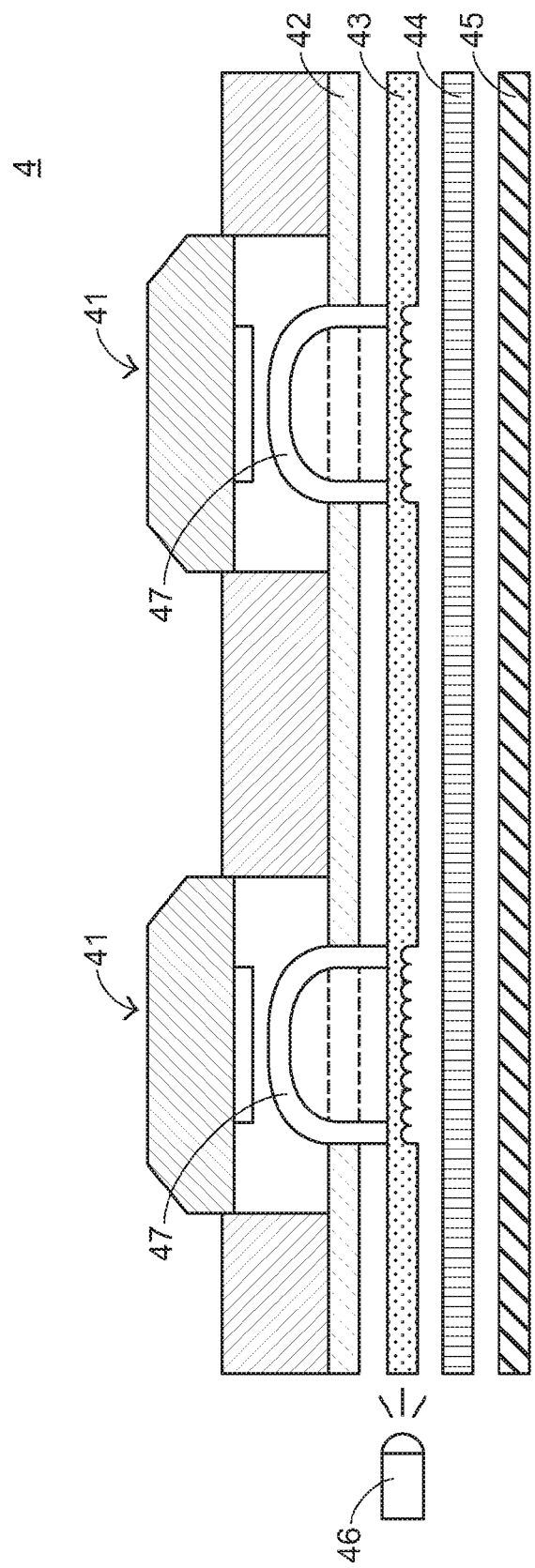
FIG. 11 is a schematic cross-sectional view illustrating an illuminated keyboard according to a second embodiment of the present invention.

The present invention further provides an illuminated keyboard of a second embodiment. FIG. 11 is a schematic cross-sectional view illustrating an illuminated keyboard according to a second embodiment of the present invention.

In FIG. 11, a key 41, a supporting plate 42, a light guide plate 43, a sensing circuit layer 44 and a metallic base plate 45 of the illuminated keyboard 4 are sequentially arranged from top to bottom. Moreover, the illuminated keyboard 4 further comprises a light-emitting element 46 and a light-transmissible elastic element 47. The light-emitting element 46 is located at a side of the light guide plate 43. The light-transmissible elastic element 47 is disposed on the light guide plate 43. The light-transmissible elastic element 47 is disposed on the light guide plate 43. Moreover, the light-transmissible elastic element 47 is penetrated through the supporting plate 42 and partially exposed over the supporting plate 42.

The structures and materials of the components of the illuminated keyboard 4 are similar to those of the illuminated keyboard 3 of first embodiment, and are not redundantly described herein.

In comparison with the first embodiment, the light guide plate 43 of the illuminated keyboard 4 of the second embodiment is disposed over the sensing circuit layer 44. Since the light guide plate 43 is disposed over the sensing circuit layer 44, it is not necessary to make the sensing circuit layer 44 light-transmissible.

Figure 12:
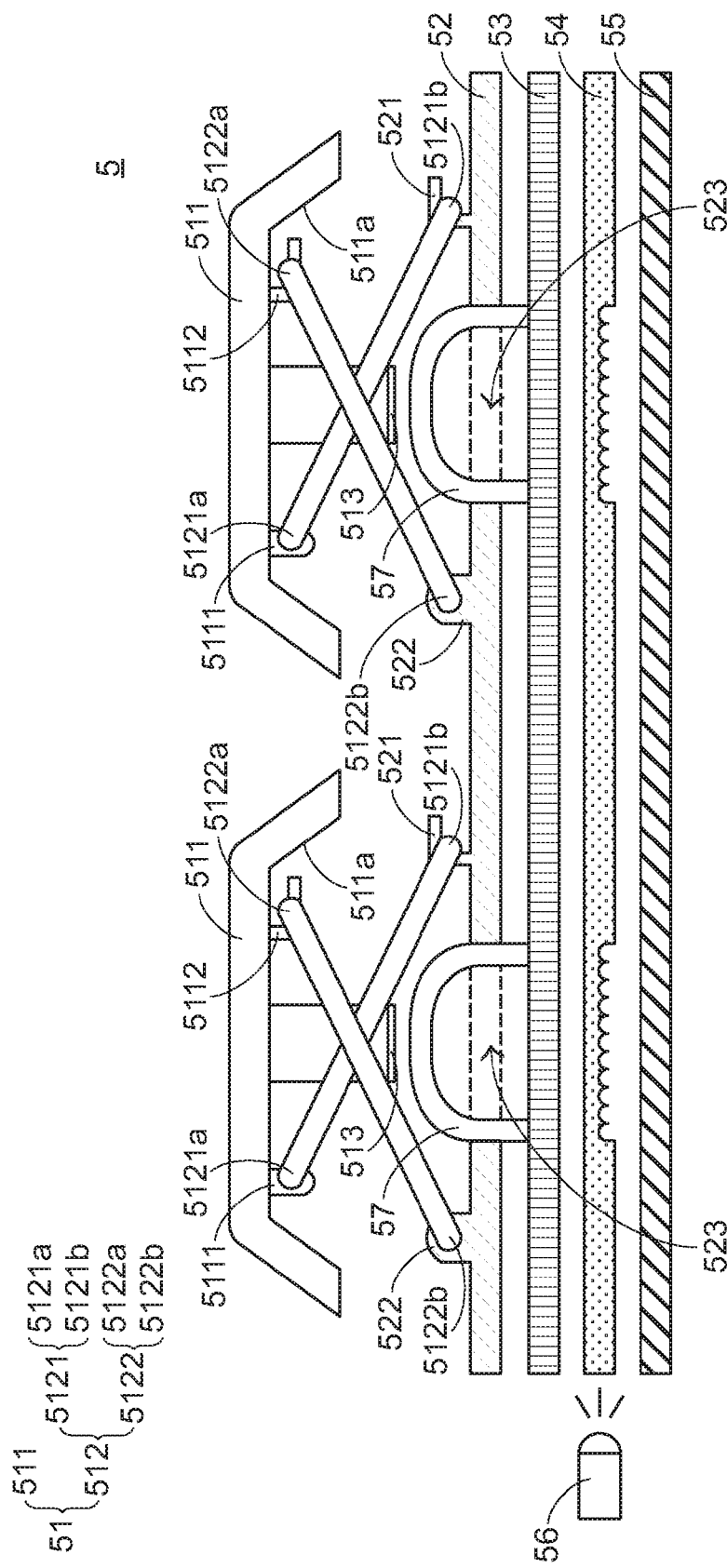
FIG. 12 is a schematic cross-sectional view illustrating an illuminated keyboard according to a third embodiment of the present invention.

Hereinafter, an illuminated keyboard of a third embodiment will be illustrated with reference to FIG. 12. FIG. 12 is a schematic cross-sectional view illustrating an illuminated keyboard according to a third embodiment of the present invention.

In FIG. 12, a key 51, a supporting plate 52, a sensing circuit layer 53, a light guide plate 54 and a metallic base plate 55 of the illuminated keyboard 5 are sequentially arranged from top to bottom. Moreover, the illuminated keyboard 5 further comprises a light-emitting element 56 and a light-transmissible elastic element 57. The light-emitting element 56 is located at a side of the light guide plate 54.

In comparison with the first embodiment and the second embodiment, the key 51 and supporting plate 52 of the illuminated keyboard 5 of the third embodiment are distinguished.

In this embodiment, the key 51 comprises a keycap 511 and a connecting element 512. The connecting element 512 is a scissors-type connecting element.

Moreover, the scissors-type connecting element 512 comprises a first frame 5121 and a second frame 5122. The first frame 5121 is pivotally coupled to the second frame 5122, and the first frame 5121 and the second frame 5122 intersect each other. A first end 5121a of the first frame 5121 and a first end 5122a of the second frame 5122 are connected to a first fixing structure 5111 and a second fixing structure 5112 of the keycap 511, respectively. A second end 5121b of the first frame 5121 and a second end 5122b of the second frame 5122 are connected to a third fixing structure 521 and a fourth fixing structure 522 of the supporting plate 52, respectively.

As any keycap 511 is depressed, the first frame 5121 and the second frame 5122 are rotated relative to each other. Consequently, the keycap 511 is moved downwardly.

Moreover, the keycap 511 is light-transmissible. When a light beam is projected onto the keycap 511, the light beam can be outputted from the character region or the symbol region of the keycap 511. Moreover, a conductive structure 513 is formed on an inner surface 511a of the keycap 511. In this embodiment, the conductive structure 513 is a metallic paint film coated on the inner surface 511a of the keycap 511 or a conductive foam structure fixed on the inner surface 511a of the keycap 511, but is not limited thereto.

Moreover, the light-transmissible elastic element 57 is disposed on the sensing circuit layer 53. The light-transmissible elastic element 57 is penetrated through a corresponding opening 523 of the supporting plate 52 and partially exposed over the supporting plate 52. As the light-transmissible elastic element 57 is pressed by the keycap 511 and moved downwardly, the light-transmissible elastic element 57 generates an elastic force. In response to the elastic force, the keycap 511 may be returned to an original position where the keycap 511 is not depressed.

In particular, as the keycap 511 is moved downwardly, the light-transmissible elastic element 57 is compressed and subjected to deformation. When the keycap 511 is no longer depressed by the user, the light-transmissible elastic element 57 is restored to its original shape. Consequently, the keycap 511 is moved upwardly and returned to the original position where the keycap 511 is not depressed. At the same time, the first frame 5121 and the second frame 5122 are rotated relative to each other again, and thus the first frame 5121 and the second frame 5122 are returned to their original positions.

The structures and materials of other components of the illuminated keyboard 5 are similar to those of the illuminated keyboard 3 of first embodiment, and are not redundantly described herein.

Figure 13:
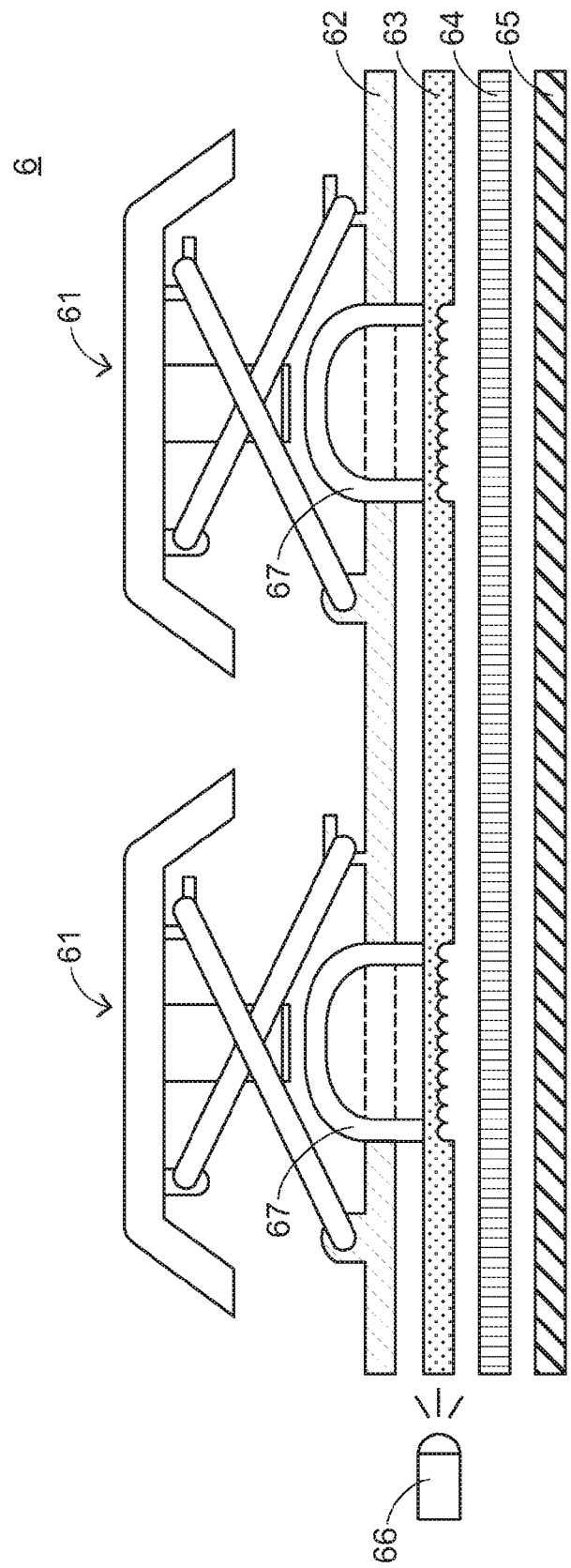
FIG. 13 is a schematic cross-sectional view illustrating an illuminated keyboard according to a fourth embodiment of the present invention.

Hereinafter, an illuminated keyboard of a fourth embodiment will be illustrated with reference to FIG. 13. FIG. 13 is a schematic cross-sectional view illustrating an illuminated keyboard according to a fourth embodiment of the present invention.

In FIG. 13, a key 61, a supporting plate 62, a light guide plate 63, a sensing circuit layer 64 and a metallic base plate 65 of the illuminated keyboard 6 are sequentially arranged from top to bottom. Moreover, the illuminated keyboard 6 further comprises a light-emitting element 66 and a light-transmissible elastic element 67. The light-emitting element 66 is located at a side of the light guide plate 63. The light-transmissible elastic element 67 is disposed on the light guide plate 63. Moreover, the light-transmissible elastic element 67 is penetrated through the supporting plate 62 and partially exposed over the supporting plate 62.

The structures and materials of the components of the illuminated keyboard 6 are similar to those of the illuminated keyboard 5 of third embodiment, and are not redundantly described herein.

In comparison with the third embodiment, the light guide plate 63 of the illuminated keyboard 6 of the fourth embodiment is disposed over the sensing circuit layer 64. Since the light guide plate 63 is disposed over the sensing circuit layer 64, it is not necessary to make the sensing circuit layer 64 light-transmissible.

From the above descriptions, the present invention provides an illuminated keyboard. The illuminated keyboard has a non-contact sensing circuit layer for sensing whether the keycap is depressed by the user or not. In other words, the conventional elastic element with the protrusion part (e.g. a rubber dome) for pressing the membrane switch circuit module is not included in the illuminated keyboard of the present invention. Consequently, when the light beam from the light-emitting element is projected upwardly onto the keycap, the propagating direction of the light beam is not obviously changed. Under this circumstance, the light beam can be projected onto the whole keycap more uniformly.

Moreover, the illuminated keyboard of the present invention further comprises a light-transmissible elastic element. The shape of the light-transmissible elastic element is not restricted. The light-transmissible elastic element comprises a light-diffusing part. By adjusting the material, size or shape of the light-diffusing part, the optical path of the light beam passing through the light-diffusing part is changed. Consequently, the light beam can be projected onto the whole keycap more uniformly.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An illuminated keyboard, comprising:
   a sensing circuit layer for generating at least one non-contact key signal;
   at least one key disposed over said sensing circuit layer, wherein when said key is depressed, said non-contact key signal is correspondingly generated by said sensing circuit layer;
   at least one light-emitting element for providing a light beam to said key;
   a light guide plate disposed under said key for transferring said light beam from said light-emitting element; and
   at least one light-transmissible elastic element arranged between said key and said light guide plate for providing an elastic force to said key, wherein said light-transmissible elastic element has at least one light-diffusing part,
   wherein after said light beam from said light-emitting element is transmitted through said light-transmissible elastic element, said light beam is projected onto said key,
   wherein said sensing circuit layer comprises a first electrode layer, a second electrode layer and a first substrate, wherein said first electrode layer and said second electrode layer are formed on said first substrate, wherein said first electrode layer comprises plural first electrode patterns, and said second electrode layer comprises plural second electrode patterns, wherein when said sensing circuit layer is electrically conductive, plural electric fields between said plural first electrode patterns and said plural second electrode patterns are generated, wherein as a keycap of said key is moved to a position near a corresponding electric field, said corresponding electric field is changed, so that said non-contact key signal is generated by said sensing circuit layer.

2. The illuminated keyboard according to claim 1, wherein said light guide plate is disposed under said sensing circuit layer, wherein said light-transmissible elastic element is disposed on said sensing circuit layer, wherein said sensing circuit layer is light-transmissible.

3. The illuminated keyboard according to claim 2, wherein a first electrode layer and a second electrode layer of said sensing circuit layer is made of a transparent and electrically-conductive material.

4. The illuminated keyboard according to claim 2, further comprising a metallic base plate, wherein said metallic base plate is disposed under said light guide plate.

5. The illuminated keyboard according to claim 1, wherein said light guide plate is disposed over said sensing circuit layer, wherein said light-transmissible elastic element is disposed on said light guide plate.

6. The illuminated keyboard according to claim 5, further comprising a metallic base plate, wherein said metallic base plate is disposed under said sensing circuit layer.

7. The illuminated keyboard according to claim 1, wherein said key comprises:
   a keycap, wherein said keycap is light-transmissible; and
   a keycap guiding frame for fixing said keycap and guiding movement of said keycap, wherein said keycap guiding frame comprises at least one hollow portion, wherein said keycap is movable within said hollow portion.

8. The illuminated keyboard according to claim 7, further comprising a supporting plate, wherein said supporting plate is disposed under said keycap guiding frame for fixing said keycap guiding frame, wherein said supporting plate further comprises an opening, wherein said light-transmissible elastic element is penetrated through said opening and partially exposed over said supporting plate.

9. The illuminated keyboard according to claim 7, further comprising a conductive structure, wherein said conductive structure is formed on an inner surface of said keycap, wherein said conductive structure is a metallic paint film or a conductive foam structure.

10. The illuminated keyboard according to claim 1, wherein said key comprises:
    a keycap, wherein said keycap is light-transmissible; and
    a connecting element, wherein said connecting element is connected with said keycap, so that said keycap is movable upwardly or downwardly relative to said sensing circuit layer, wherein said connecting element is a scissors-type connecting element.

11. The illuminated keyboard according to claim 10, further comprising a supporting plate, wherein said supporting plate is disposed under said connecting element for fixing said connecting element, wherein said supporting plate further comprises an opening, wherein said light-transmissible elastic element is penetrated through said opening and partially exposed over said supporting plate.

12. The illuminated keyboard according to claim 10, further comprising a conductive structure, wherein said conductive structure is formed on an inner surface of said keycap, wherein said conductive structure is a metallic paint film or a conductive foam structure.

13. The illuminated keyboard according to claim 1, wherein said light-emitting element is located at a side of said light guide plate.

14. The illuminated keyboard according to claim 1, further comprising plural light-guiding structures, wherein said plural light-guiding structures are formed on said light guide plate corresponding to a keycap of said key, wherein said light beam from said light-emitting element is guided by said plural light-guiding structures to be projected onto said keycap.

15. The illuminated keyboard according to claim 1, wherein said sensing circuit layer is a capacitive sensing circuit layer.

16. An illuminated keyboard comprising:
a sensing circuit layer for generating at least one non-contact key signal:
at least one key disposed over said sensing circuit layer, wherein when said key is depressed, said non-contact key signal is correspondingly generated by said sensing circuit layer;
at least one light-emitting element for providing a light beam to said key;
a light guide plate disposed under said key for transferring said light beam from said light-emitting element; and
at least one light-transmissible elastic element arranged between said key and said light guide plate for providing an elastic force to said key, wherein said light-transmissible elastic element has at least one light-diffusing part,
wherein after said light beam from said light-emitting element is transmitted through said light-transmissible elastic element, said light beam is projected onto said key,
wherein said sensing circuit layer comprises a first electrode layer, a second electrode layer, a second substrate and a third substrate, wherein said first electrode layer and said second electrode layer are formed on said second substrate and said third substrate, respectively, wherein said first electrode layer comprises plural first electrode patterns, and said second electrode layer comprises plural second electrode patterns, wherein when said sensing circuit layer is electrically conductive, plural electric fields between said plural first electrode patterns and said plural second electrode patterns are generated, wherein as a keycap of said key is moved to a position near a corresponding electric field, said corresponding electric field is changed, so that said non-contact key signal is generated by said sensing circuit layer.

17. An illuminated keyboard comprising:
a sensing circuit layer for generating at least one non-contact key signal;
at least one key disposed over said sensing circuit layer, wherein when said key is depressed, said non-contact key signal is correspondingly generated by said sensing circuit layer;
at least one light-emitting element for providing a light beam to said key;
a light guide plate disposed under said key for transferring said light beam from said light-emitting element; and
at least one light-transmissible elastic element arranged between said key and said light guide plate for providing an elastic force to said key, wherein said light-transmissible elastic element has at least one light-diffusing part,
wherein after said light beam from said light-emitting element is transmitted through said light-transmissible elastic element, said light beam is projected onto said key,
wherein said light-diffusing part comprises plural microstructures, a curvy surface or a lens, wherein after said light beam from said light-emitting element is transmitted through said light-transmissible elastic element, an optical path of said light beam is changed by said plural microstructures, said curvy surface or said lens.

18. The illuminated keyboard according to claim 17, wherein said plural microstructures are plural V-cut structures or plural texturing structures.

19. The illuminated keyboard according to claim 17, wherein said lens is integrally formed with said light-transmissible elastic element.

* * * * *